United States Patent

Beasley

[15] 3,685,561

[45] Aug. 22, 1972

[54] SKINNING AND SLASHING MACHINE

[72] Inventor: Donald L. Beasley, Des Moines, Iowa

[73] Assignee: Townsend Engineering Company, Des Moines, Iowa

[22] Filed: March 18, 1971

[21] Appl. No.: 125,778

[52] U.S. Cl. ............................................146/130, 69/9
[51] Int. Cl. ..............................................A22c 17/12
[58] Field of Search ............146/130; 69/9, 11, 13, 16

[56] References Cited

UNITED STATES PATENTS 2,522,728 9/1950 Townsend ..................146/130
2,912,027 11/1959 Townsend ..................146/130

*Primary Examiner*—Willie G. Abercrombie
*Attorney*—Zarley, McKee & Thomte

[57] ABSTRACT

A skinning and slashing machine comprising a frame means having a skinning blade means mounted on the frame means which removes the skin from the meat product to be skinned as the meat product is moved therepast. A plurality of spaced apart, flat slashing blades are rotatably mounted on the frame means adjacent the blade means and are adapted to slash the meat product to permit the inspection thereof. The blades have a plurality of staggered and spaced apart notches formed in the peripheries thereof which engage the meat product to pull the meat product therethrough and to force the meat product past the skinning blade means.

8 Claims, 3 Drawing Figures

Patented Aug. 22, 1972
3,685,561
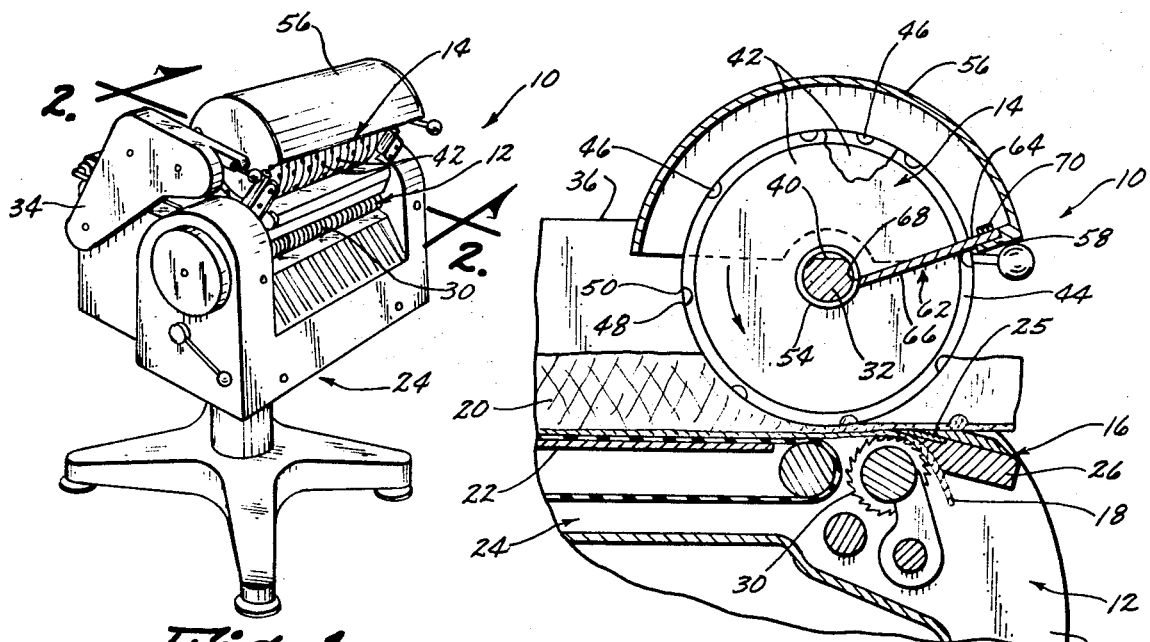
Fig. 1
Fig. 2
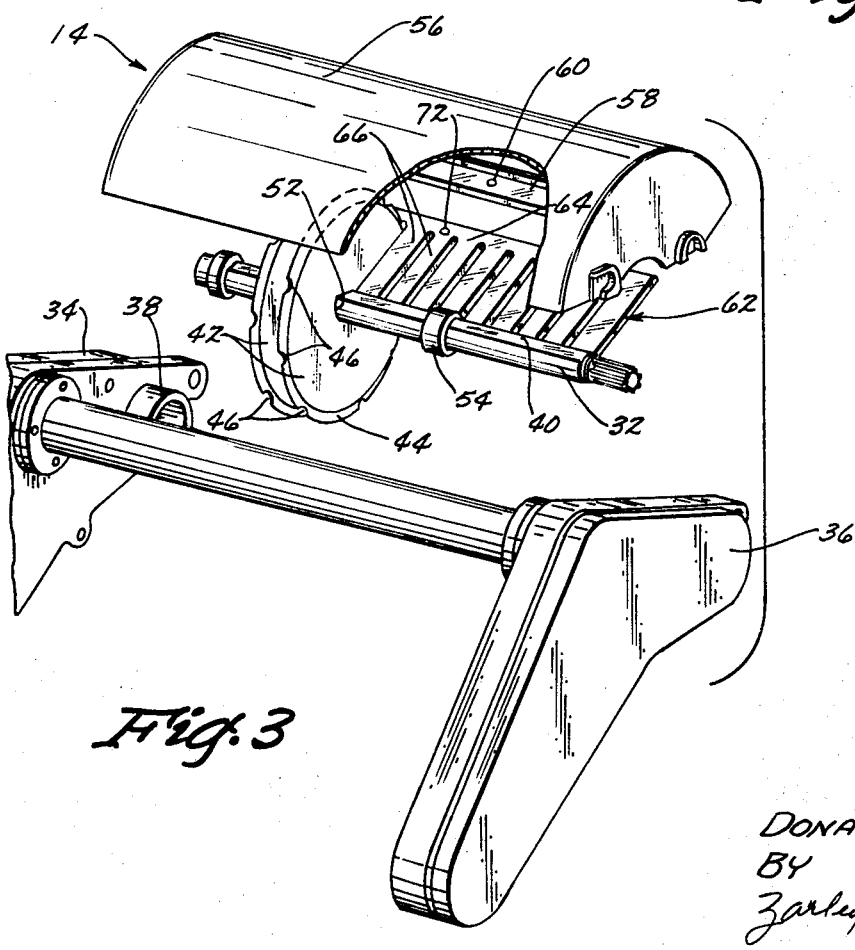
Fig. 3
INVENTOR
DONALD L. BEASLEY
BY
Zarley, McKee & Thomte
ATTORNEYS

SKINNING AND SLASHING MACHINE

Skinning machines such as those described in U.S. Pat. Re. No. 23,222; U. S. Pat. No. 2,522,728; and U. S. Pat. No. 2,912,027 are employed to remove the skins from meat products such as pork jowls or the like. It is necessary that the pork jowls be inspected for abscesses and the machine disclosed in U. S. Pat. No. 2,912,027 provided a slashing means which slashed the pork jowls along the entire width thereof to expose any abscesses which were present in the jowls. The slashing blades disclosed in U. S. Pat. No. 2,912,027 could not be sharpened due to the configuration thereof which resulted in the necessity of fairly frequent replacement of the blades.

Therefore, it is a principal object of this invention to provide an improved skinning and slashing machine.

A further object of this invention is to provide a skinning and slashing machine including a plurality of slashing blades which may be sharpened.

A further object of this invention is to provide a skinning and slashing machine including a plurality of spaced apart slashing blades which have means on the peripheries thereof to pull the meat product through the machine.

A further object of this invention is to provide a skinning and slashing machine including a plurality of spaced apart slashing blades having semi-circular notches formed in the peripheries thereof, the notches of the adjacent blades being staggered with respect to each other.

A further object of this invention is to provide a skinning and slashing machine including stripping means thereon which effectively strips the slashed port jowls from the slashing blades.

A further object of this invention is to provide a skinning and slashing machine which is economical of manufacture and durable in use.

These and other objects will be apparent to those skilled in the art.

This invention consists in the construction, arrangements and combination of the various parts of the device, whereby the objects contemplated are attained as hereinafter more fully set forth, specifically pointed out in the claims, and illustrated in the accompanying drawings, in which:

FIG. 1 is a perspective view of a skinning and slashing machine;

FIG. 2 is an enlarged sectional view seen along lines 2—2 of FIG. 1; and

FIG. 3 is a partial exploded perspective view of the slashing portion of the invention.

Referring now to the drawings, the numeral 10 generally designates the skinning and slashing machine of this invention comprising generally a skinning apparatus 12 and a slashing apparatus 14. The skinning apparatus 12 is conventional in design and is of the type manufactured by Townsend Engineering Company of Des Moines, Iowa. The details of the skinning apparatus are not critical to this invention except that a skinning blade means 16 must be provided for removing the skin 18 from the meat product 20 such as a pork jowl. A feed conveyor means 22 is mounted on the frame means 24 and is adapted to move the product 20 towards the skinning blade means 16 as will be described in more detail hereinafter. While it is preferred that a feed means such as the conveyor means 22 be provided, an inclined feed table may be substituted therefore such as disclosed in U. S. Pat. No. 2,912,027.

Skinning blade means 16 includes a blade 25 which extends from the leading edge of a pressure shoe 26 which is movably mounted on the frame means 24 in conventional fashion so that the shoe may cooperate with the toothed roll 30 which is rotatably mounted on the frame means 24. The purpose of the toothed roll 30 is to aid in removing the skin 18 from the meat product 20 after it has been severed therefrom by the skinning blade 25. The toothed roll 30 pulls the severed portion of the skin 18 downwardly from the blade 25 in conventional fashion. The conveyor means 22 and toothed roll 30 are powered by power means not shown in the drawings.

The slashing means 14 of this invention comprises generally a rotatable shaft 32 which is rotatably mounted in and extends between the frame members 34 and 36 as seen in FIG. 3. One end of shaft 32 is rotatably received in a collar 38 while the other end of the shaft 32 is suitably connected to a power means for rotating the same. Shaft 32 includes a flat 40 thereon which extends the length thereof. A plurality of flat slashing blades 42 are mounted on the shaft 32 for rotation therewith in a spaced apart relationship. Each of the blades 42 includes a tapered V-shaped cutting edge 44 having a plurality of spaced apart notches 46 formed therein. As seen in FIG. 2, the notches 46 are semi-circular in configuration and define a leading shoulder 48 and a trailing shoulder 50. Each of the blades 42 have a central opening 52 formed therein for receiving the shaft 32. The configuration of the opening 52 corresponds to the cross sectional configuration of the shaft 32 so that rotation of the shaft 32 will cause the rotation of the blades 42. The notches 46 are formed in the blades 42 in such a manner so that the notches of one blade 42 will be offset or staggered with respect to the notches of the next adjacent blade 42 as illustrated in FIGS. 2 and 3. The blades 42 are spaced along the length of the shaft 32 by means of spacer rings 54 which embrace the shaft 32 between each of the blades 42.

A cover 56 is movably mounted on the frame members 34 and 36 and extends over the slashing blades 42 in the manner illustrated in FIGS. 2 and 3. The cover 56 includes a rearwardly extending flange 58 at its forward end which has a plurality of openings 60 formed therein. The numeral 62 refers to a stripping mechanism including a base portion 64 and a plurality of spaced apart stripping fingers 66 extending therefrom. The fingers 66 are integrally formed with the base portion 64 and have a beveled end 68 thereon. The stripping mechanism 62 is secured to the flange 58 by bolts 70 extending through the openings 60 and 72 to position the stripping mechanism in the cover 56. The fingers 66 are received between each pair of blades 42 with the beveled end 68 thereof being closely positioned the spacer rings 54 as illustrated in FIG. 2.

The normal method of operation is as follows. The power means powering the slashing means 14, toothed roll 30 and conveyor means 22 are energized and a pork jowl 20 is placed on the conveyor means 22. The conveyor means 22 moves the jowl 20 into engagement with the rotating blades 42 which slice through the jowl substantially to the skin 18 as illustrated in FIG. 2. As the blades 42 slice or slash the jowl 20, the semi-circular notches 46 in the peripheries of the blades 42 engage the jowl 20 and force or pull the jowl 20 through the blades and through the machine. The trailing shoulders 50 in each of the notches 46 bite into the jowl and propel the jowl towards the skinning blade 25 and therepast. The fact that the notches 46 in one blade 42 are offset with the notches 46 in the next adjacent blade 42 insures that a smooth and continuous propelling motion will be imparted to the jowl 20. The continued propulsion of the jowl 20 by the notches 46 causes the jowl 20 to pass completely through the machine. The stripping fingers 66 prevent the slashed meat from riding up around the rotating blades after the blades have slashed the jowl 20. The fact that the ends of the fingers 66 terminate closely adjacent the spacer rings 54 insures that the jowl will be effectively stripped from the blades so that the machine operates in an efficient manner.

The cutting edges on the blades 42 are such that they may be sharpened as they become dull during use which eliminates the necessity of constantly replacing the slashing blades. The blades 42 efficiently slash through the jowl 20 to expose an abscesses that may be present therein. Thus it can be seen that the machine accomplishes at least all of its stated objectives.

I claim:

1. A skinning and slashing machine comprising, a frame means, a skinning blade means mounted on said frame means for removing the skin from the article to be skinned as the article is moved therepast, and a slasher means rotatably mounted on said frame means adjacent said blade means and spaced therefrom, said slasher means comprising a plurality of spaced apart, flat slashing blades for slashing the article and having means formed on the peripheries thereof to pull the article past the skinning blade means.

2. The machine of claim 1 wherein said means of the peripheries of said slashing blades comprising a plurality of spaced apart notches formed therein.

3. The machine of claim 2 wherein the notches in the slashing blades are offset with respect to the notches in the next adjacent slashing blade.

4. The machine of claim 2 wherein said notches are semi-circular in configuration.

5. The machine of claim 2 wherein each of said slashing blades has a V-shaped peripheral cutting edge.

6. The machine of claim 1 wherein a cover means at least partially extends over the upper portion of said slashing means, and a plurality of spaced apart stripping fingers secured to said cover means extending inwardly therefrom between the slashing blades strip the article from the slashing blades after the slashing blades have slashed the article.

7. The machine of claim 6 wherein said stripping fingers terminate closely adjacent said rotatable shaft.

8. The machine of claim 6 wherein said stripping fingers are integrally formed and extend inwardly from a base portion, said slashing blades being mounted on a rotatable shaft, a spacer ring on said shaft between each pair of blades, each of said fingers having a beveled end portion which terminates closely adjacent one of said spacer rings.

* * * * *